(12) United States Patent
Baldischweiler et al.

(10) Patent No.: US 7,805,718 B2
(45) Date of Patent: Sep. 28, 2010

(54) OPTIMISATION OF A COMPILER GENERATED PROGRAM CODE

(75) Inventors: Michael Baldischweiler, München (DE); Werner Ness, Unterschleissheim (DE)

(73) Assignee: Giesecke & Devrient GmbH, Munich (DE)

( * ) Notice: Subject to any disclaimer, the term of this patent is extended or adjusted under 35 U.S.C. 154(b) by 914 days.

(21) Appl. No.: 10/511,688

(22) PCT Filed: Apr. 11, 2003

(86) PCT No.: PCT/EP03/03803

§ 371 (c)(1),
(2), (4) Date: Jun. 6, 2005

(87) PCT Pub. No.: WO03/088039

PCT Pub. Date: Oct. 23, 2003

(65) Prior Publication Data

US 2005/0235268 A1 Oct. 20, 2005

(30) Foreign Application Priority Data

Apr. 15, 2002 (DE) ................. 102 16 602

(51) Int. Cl.
*G06F 9/45* (2006.01)

(52) U.S. Cl. .............. 717/159; 717/139; 717/151; 712/227

(58) Field of Classification Search ........... 717/136, 717/139, 146, 158; 712/245
See application file for complete search history.

(56) References Cited

U.S. PATENT DOCUMENTS

| 5,339,428 | A | * | 8/1994 | Burmeister et al. | 717/146 |
| 5,815,721 | A | * | 9/1998 | Benitez | 717/160 |
| 5,903,759 | A | | 5/1999 | Sun et al. | |
| 6,263,429 | B1 | * | 7/2001 | Siska | 712/245 |
| 6,718,543 | B2 | * | 4/2004 | Arai et al. | 717/158 |
| 6,952,820 | B1 | | 10/2005 | Schultz et al. | |
| 2004/0194071 | A1 | * | 9/2004 | Tanaka | 717/136 |

(Continued)

FOREIGN PATENT DOCUMENTS

FR 2 783 065 3/2000

(Continued)

OTHER PUBLICATIONS

Michael J. Zastre, "Compacting Object Code via Parameterized Procedural Abstraction," Thesis, University of Victoria, 1993 (XP-001199580).

(Continued)

*Primary Examiner*—Lewis A Bullock, Jr.
*Assistant Examiner*—Michael Yaary
(74) *Attorney, Agent, or Firm*—Martine Penilla & Gencarella, LLP

(57) ABSTRACT

In a method for the optimisation of compiler-generated program code, the compiler-generated program code is searched for program code fragments which correspond, at least in their effect, to respectively one library code fragment contained in a predefined library. The program code fragments found thereby are replaced by respectively one call of the corresponding library code fragment. A computer program product comprises program instructions for the execution of this method. A portable data carrier contains both the program code optimised according to this method and the library.

22 Claims, 1 Drawing Sheet

U.S. PATENT DOCUMENTS

2008/0115117 A1* 5/2008 Wilkinson et al. .......... 717/139

FOREIGN PATENT DOCUMENTS

| | | |
|---|---|---|
| FR | 2 785 695 | 5/2000 |
| JP | 55-137360 | 10/1980 |
| JP | 01-128136 | 5/1989 |
| JP | 03-291786 | 12/1991 |
| JP | 08-263299 | 10/1996 |
| JP | 11-327887 | 11/1999 |
| JP | 2000-347878 | 12/2000 |
| JP | 2001-216168 | 8/2001 |
| JP | 2002-501269 | 1/2002 |
| WO | WO 99/38131 | 7/1999 |
| WO | WO 00/19309 | 4/2000 |
| WO | WO 00/28416 | 5/2000 |

OTHER PUBLICATIONS

Christian Ferdinand, Post Pass Code Compaction at the Assembly Level for C16x, Infineon Technologies, pp. 35-36 (article retrieved from the Internet in Oct. 2001 at URL: www.absint.com/aipop/aiPop_c3935.pdf).

Saumya K Debray et al., "Compiler Techniques for Code Compaction," *ACM Transactions on Programming Languages and Systems*, vol. 22, No. 2, Mar. 2000, pp. 378-415 (pages numbered 1-38 on attached copy).

Website content entitled "Raisonance Announces New Post Linker Optimizer for 80C51 Microcontroller Architecture," retrieved from the Internet in Oct. 2001 (2 pages) (URL: http://www.8052.com/news.phtml?NEWSID=8).

Christian Ferdinand, "Liebling, ich habe den Code geschrumpft," Design & Elektronik No. 1, 2001, pp. 113-115.

W. Rankle and W. Effing, "Smart Card Handbook," 3d Ed., 2003, John Wiley & Sons, Ltd., pp. 62-91.

Abstract of Japanese Patent Publication No. 55-137360 Pub. Date: Oct. 27, 1980, Patent Abstracts of Japan.

Abstract of Japanese Patent Publication No. 01-128136 Pub. Date: May 19, 1989, Patent Abstracts of Japan.

Abstract of Japanese Patent Publication No. 03-291786 Pub. Date: Dec. 20, 1991, Patent Abstracts of Japan.

Abstract of Japanese Patent Publication No. 08-263299 Pub. Date: Oct. 11, 1996, Patent Abstracts of Japan.

Abstract of Japanese Patent Publication No. 11-327887 Pub. Date: Nov. 30, 1999, Patent Abstracts of Japan.

Abstract of Japanese Patent Publication No. 2000-347878 Pub. Date: Dec. 15, 2000, Patent Abstracts of Japan.

Abstract of Japanese Patent Publication No. 2001-216168 Pub. Date: Aug. 10, 2001, Patent Abstracts of Japan.

* cited by examiner

OPTIMISATION OF A COMPILER GENERATED PROGRAM CODE

BACKGROUND OF THE INVENTION

1. Field of the Invention

The invention relates to the programming of portable data carriers and to the execution of programs by portable data carriers. A portable data carrier within the meaning of the present document may be, in particular, a chip card (smart card), in various designs, or a chip module.

2. Description of the Related Art

Portable data carriers, as they are in common use today, have a processor core and a plurality of memories produced in different technologies. In a typical configuration, for example, a mask-programmed ROM, an electrically erasable and programmable EEPROM and a writeable RAM are provided. The RAM serves as a working memory during the running of the program, while the program code to be executed by the processor core can be stored in the ROM and/or in the EEPROM. These and similar designs of data carriers are described in section 3.4 of the book "Handbuch der Chipkarten" by W. Rankl and W. Effing, Hanser Verlag, third edition 1999.

Typically, a memory cell in the EEPROM occupies approximately four times the chip area of a ROM memory cell. In order to save chip area, or to achieve greater available memory capacity with the same area, it is therefore desirable for the executable program code to be accommodated as extensively as possible in the ROM. However, it is necessary that the content of the mask-programmed ROM is unalterably defined for large numbers of data carriers as early as during the production stage of the mask-programmed ROM. Writing into the EEPROM, by contrast, is performed only upon the completion and initialisation of a series of data carriers, or when the individual data carriers are personalised. Due to the greater flexibility, therefore, it is advantageous for the executable program code to be stored as extensively as possible in the EEPROM. This applies both to the programming of smaller production volumes of data carriers and to the correction of faults and the introduction of additional functions in the case of large-volume production.

SUMMARY OF THE INVENTION

In the programming of portable carriers, there is therefore the problem of, on the one hand, using the mask-programmed ROM or a comparable memory as extensively as possible and, on the other hand, achieving as great a flexibility as possible for program changes and/or for the production of data carriers in smaller production volumes.

According to the invention, the above problem is solved, wholly or partially, by a method for optimizing compiler-generated program code intended for a portable data carrier having both a processor core and a first and second memory area, the first memory area being provided to receive the optimized program code, the second memory area being provided to receive a predefined library having a multiplicity of library code fragments, and the compiler-generated program code being searched for program code fragments which correspond, at least in respect of their effect, to respectively one library code fragment, the program code fragments found thereby being replaced by respectively one call of the corresponding library code fragment.

Further according to the invention, the above problem is solved, wholly or partially, by a computer program product comprising program instructions for a general-purpose computer which cause the general-purpose computer to optimize compiler-generated program code intended for a portable data carrier having both a processor core and a first and second memory area, the first memory area being provided to receive the optimized program code, the second memory area being provided to receive a predefined library having a multiplicity of library code fragments, and the compiler-generated program code being searched for program code fragments which correspond, at least in respect of their effect, to respectively one library code fragment, the program code fragments found thereby being replaced by respectively one call of the corresponding library code fragment.

Further according to the invention, the above problem is solved, wholly or partially, by a portable data carrier having a processor core, a first memory area and a second memory area, there being contained in the first memory area optimized program code, and there being contained in the second memory area a library which is predefined independently of the optimized program code and has a multiplicity of library code fragments, wherein the optimized program code has been obtained from compiler-generated program code by searching for program code fragments which correspond, at least in respect of their effect, to respectively one library code fragment, the program code fragments found thereby being replaced by respectively one call of the corresponding library code fragment.

The sequence in which the steps are itemised in the claims relating to the method is not to be understood as a limitation of the extent of protection. Rather, developments of the invention are provided for in which these steps are performed in a different sequence, or wholly or partially in parallel, or wholly or partially interleaved with one another.

The invention proceeds from the basic idea of using a predefined library containing a multiplicity of library code fragments for the purpose of optimizing the program code. In the optimization method according to the invention, the program code to be optimized, for its part, is searched for program code fragments which correspond in their effect or function to respectively one library code fragment. Such program code fragments are replaced by respectively one call of the corresponding library code fragment. The optimized program code is stored in a first memory area of the data carrier (e.g., in the EEPROM), while the library is provided for storage in a second memory area (e.g., in the ROM).

In tests performed by the inventors, the optimization procedure according to the invention resulted in a marked reduction of the size of the program code provided for the first memory area. This result is unexpected, since one would intuitively assume that, with a library of realistic extent, only few parts of the program code would be found to correspond to the library code fragments.

The reduction of the code size brought about by the invention has the result that, in the case of a data carrier with a predefined amount of memory, program code for additional functions can be included in the first memory area. If the first memory area is designed as an EEPROM or in a comparable technology, this program code need only be loaded upon the completion or initialisation or personalisation of the data carrier. The program code which, due to its compactness, implements a multiplicity of functions, can therefore be changed or newly written both rapidly and even for small production volumes of data carriers, or even for single data carriers.

According to the invention, the predefined library is located in the second memory area, i.e., for example, in the mask-programmed ROM. Normally, the saving of program code achieved by the optimization according to the invention is less than the size of the library. Even in this case, however, the application of the invention is advantageous, due to the better utilisation of the valuable first memory area. If in the compiler-generated program code there are many code fragments, groups of which in each case can be replaced by respectively one single code fragment of the library, and if the library contains only few code fragments which are not required, the optimization can result in the program code shrinking by even more than the length of the library. In this case, use of the invention is advantageous even if the first and second memory areas are only conceptual sections of one and the same physical memory field.

According to the invention, for the purpose of optimization a search is performed for program code fragments, i.e., for sections in the compiler-generated program code which can be replaced by corresponding library code fragments. This subsequent optimization procedure need not be taken into account by the programmer during program generation; in particular, the programmer need not make provision in the program for calls of library routines. Thus, programming is not in any way rendered more difficult by the invention.

In the choice of words used here, the terms "program code" or "code fragment" are intended to denote both executable machine code, before or after linkage, and the corresponding assembler source code. In other words, in different developments of the invention the optimization procedure according to the invention can be performed both on the basis of the compiler-generated assembler source code and on the basis of the already assembled machine code. In the case of the former, the assembling and, if necessary, the linkage are performed only after optimization. The library, likewise, can be available during optimization as assembler source code and/or as already assembled machine code.

In general, a replacement of a program code fragment by a library code fragment is possible whenever both code fragments perform mutually corresponding functions. In this connection, complex calculations can be performed in respect of the exact effects of code fragments in order, for example, to initiate a replacement procedure even if individual instructions in the code fragments are commuted in an innocuous manner. In particularly simple exemplary embodiments, by contrast, a replacement is performed only if the code fragments are identical in respect of the machine code defined by them. Even in the case of this simple development, however, a certain analysis of the code fragments is required, due to the fact that, for example, a code fragment having a jump with a jump destination which is not in the code fragment may not generally be replaced.

Additional replacement possibilities ensue if parameterised code fragments are used which, in a manner similar to a procedure call, contain one or more parameters (e.g., memory addresses or numerical values).

Preferably, a library code fragment is normally called through a subroutine call instruction inserted in the program code. A return instruction, immediately following the library code fragment, is then provided in the library. Exceptions from this rule may apply in some embodiments if the code fragment to be replaced interferes with the program flow. If, for example, the code fragment ends with a subroutine return instruction, the call can normally be effected by means of a jump instruction.

According to the invention, the library used is predefined, i.e., not dependent on the program code processed in the current optimization run. In order to achieve the best possible optimization results, however, the library is preferably designed so that it contains appropriate entries for frequently occurring structures of the program code. Such frequently occurring code sections may depend, in particular, on the hardware and/or an operating system of the data carrier and/or on a compiler used in the generation of the compiler-generated program code.

The computer program product provided according to the invention may be, in particular, a computer-readable data carrier such as, for example, an electronic or magnetic or optical memory medium, but it is not limited to physical data carriers. Electrical or optical signals (e.g., voltage levels of a communication link) are also to be understood as computer program product in the sense used here. The computer program product contains program code which executes the optimization steps according to the invention. Preferably, the computer program product additionally includes a compiler and/or an assembler and/or a linker and/or a loader program.

The computer program product according to the invention and the portable data carrier according to the invention are preferably developed with features which correspond to the features described above and/or stated in the claims relating to the method.

BRIEF DESCRIPTION OF THE DRAWINGS

Further features, objects and advantages of the invention are disclosed by the following description of an exemplary embodiment and a plurality of alternative embodiments.

Reference is made to the schematic drawing, in which the sole FIGURE (FIG. 1) shows a representation of a portable data carrier and of different versions of the program code in an exemplary embodiment of the invention.

DETAILED DESCRIPTION OF THE EXEMPLARY EMBODIMENTS

Figure 1:
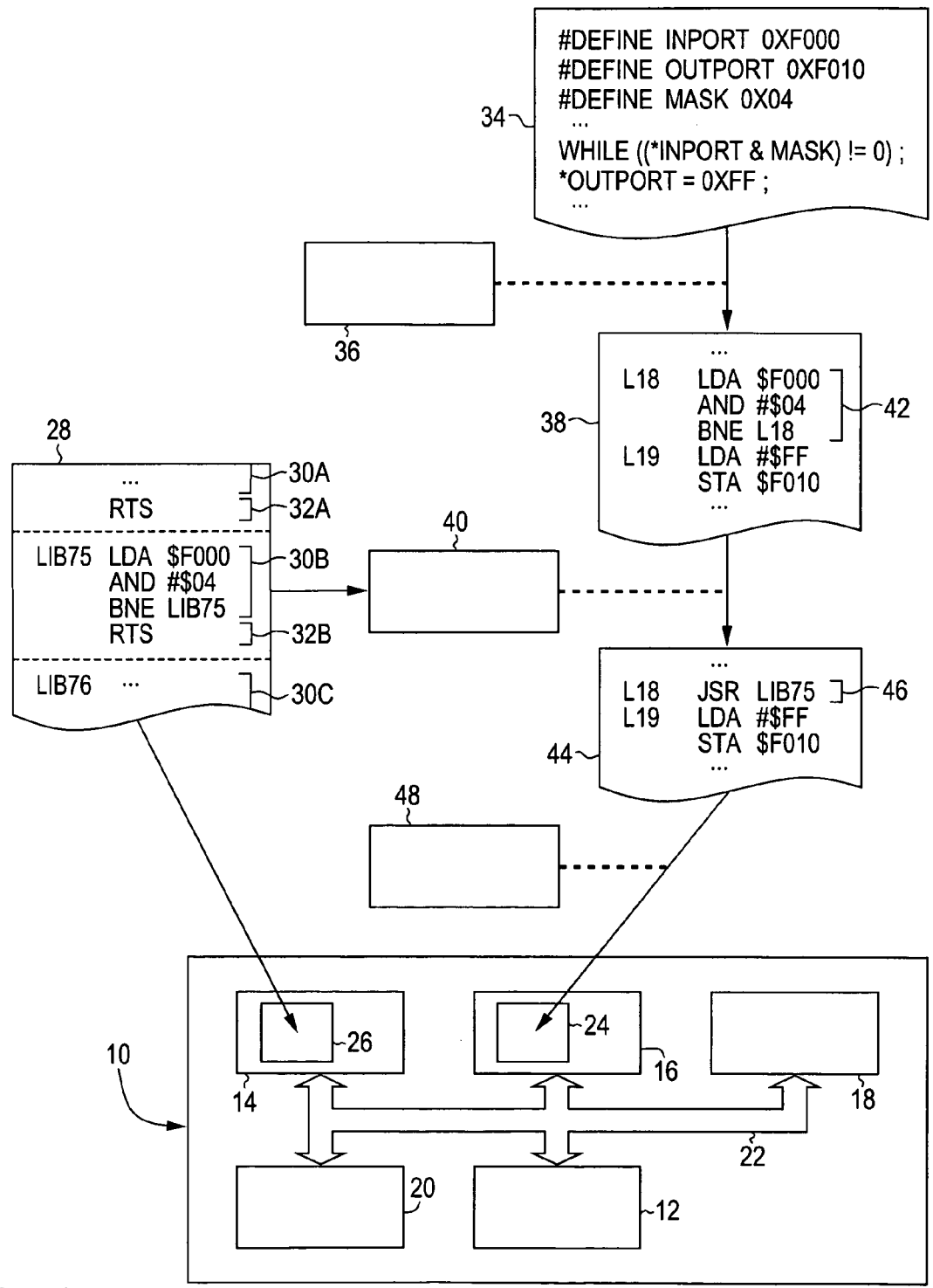

The invention is used in the programming of a portable data carrier 10 which, in the exemplary embodiment described here, is designed as a chip card. The data carrier 10 contains, in a manner known per se, a semiconductor chip having a processor core 12, a mask-programmed ROM 14, an EEPROM 16, a RAM 18, and an interface 20 for contactless or contact-bound communication. The said components are connected to one another via a bus 22. In alternative embodiments, the three memory fields 14, 16, 18 may be designed in other technologies; in particular, FLASH technology may be used for the ROM 14 and/or the EEPROM 16.

A first and a second memory area 24, 26 are conceptually provided in the memory fields 14, 16, 18. The first memory area 24 serves to receive the optimized program code in the form of executable machine code. A predefined library 28, likewise in the form of executable machine code, is stored in the second memory area 26. In the exemplary embodiment described here, the first memory area 24 is located in the EEPROM 16, and the second memory area 26 is located in the ROM 14. In a manner known per se, the ROM 14 contains, in addition to the second memory area 26, further, fixedly predefined routines which constitute, for example, an operating system of the data carrier 10. The EEPROM 16 additionally includes a file system for data which are to be stored as non-volatile data in the data carrier 10.

The library 28 has a multiplicity of predefined library code fragments 30A, 30B, 30C, ..., which are denoted generally in the following by 30$x$. In FIG. 1, for reasons of clearer representation, the library code fragments 30$x$ are shown as assembler source code. Normally, each library code fragment 30$x$ is followed immediately by a subroutine return instruction 32A, 32B, ... (denoted generally in the following by 32$x$). The subroutine return instruction 32$x$ may be omitted, however, if it cannot be reached in the execution of the library code fragment 30x due to the fact that, for example, each program flow of the library code fragment 30x ends in an exit or in a subroutine return instruction contained in the library code fragment 30x.

The program development for the portable data carrier 10 proceeds from a high-level language source code 34, which is represented exemplarily in FIG. 1 in the programming language C. The section shown in FIG. 1 waits until the third bit of the input register INPORT out from the unit position attains the value "0", and then sets the output register OUTPORT to the hexadecimal value "FF". A compiler 36 known per se converts the high-level language source code 34 into compiler-generated program code 38, which in FIG. 1 is represented in the form of assembler source code for the 6805 instruction set. Other instruction sets, respectively in accordance with the processor core 12, are provided for in alternative embodiments.

An optimization program 40 executes the optimization steps that are essential for the present exemplary embodiment. The optimization program 40 processes the compiler-generated program code 38 and, moreover, accesses information about the library code fragments 30x contained in the library 28. In different embodiment variants, this information can contain, for example, a copy of the library 28 in the assembler source code and/or a copy of the library 28 in the executable machine code and/or a specification of the effect of the individual library code fragments 30x in an appropriate description language. Furthermore, additional information such as, for example, indexes or hash tables can be provided in order to accelerate the search procedures performed by the optimization program 40.

The optimization program 40 identifies program code fragments 42 contained in the compiler-generated program code 38 which, in execution by the processor core 12, have a function which is identical to that of library code fragments 30x contained in the library 28. Used for this purpose in the present exemplary embodiment is a relatively simple procedure, in which the compiler-generated program code 38 is compared, at assembler source text level, with the individual entries in the library 28. With regard to the instructions in short form and the address and value information, a textual comparison can be performed in this case. Symbolic jump destinations, by contrast, must be converted, prior to comparison, into a standardised form or into a numeric relative value. In alternative embodiments, by contrast, the optimization can be performed on the basis of a compiler-generated program code 38 already present in the form of assembled machine code.

A program code fragment 42 for which a corresponding library code fragment 30x has been found in the comparison procedure is replaced, in the optimization procedure, by a call of this library code fragment 30x. In FIG. 1, for example, the program code fragment 42 and the library code fragment 30B are identical apart from the symbolic designation of the jump destination. In the optimized program code 44, therefore, the optimization program 40 replaces this program code fragment 42 by a call of the library code fragment 30B. In the present example, this call is designed as a subroutine call instruction 46. Since, in the present example, the program code fragment 42 corresponds to a machine code of seven bytes in length and the subroutine call instruction 46 requires only three bytes, the memory space required for the optimized program code 44 has been substantially reduced by the replacement.

Following completion of the optimization, the optimized program code 44 is converted by an assembler 48 into machine code that can be executed by the processor core 12. Following a possibly necessary linking operation with further program parts, the code is loaded into the first memory area 24 upon completion or initialisation or personalisation of the data carrier 10. The library 28 has already been present in the second memory area 26 since the time at which the chip for the data carrier 10 was produced. The data carrier 10 is therefore ready for use. The translation, optimization and assembling steps described above are performed by a general-purpose computer (not shown in FIG. 1) which executes the compiler 36, the optimization program 40 and the assembler 48.

When, in the operation of the data carrier 10, the program execution by the processor core 12 reaches the location of the subroutine call instruction 46 in the first memory area 24, the library code fragment 30B in the second memory area 26 is executed as a subroutine. In their effect, the executed instructions correspond exactly to the program code fragment 42 removed during the optimization. Following execution of these instructions, the processor core 12 executes a return, triggered by the subroutine return command 32B, to that instruction in the first memory area 24 which immediately follows the subroutine call instruction 46.

It must be ensured during the optimization that the program functions are not altered. Thus, for example, program code fragments 42 having jump instructions which might have a jump destination located outside the program code fragment 42 should only be replaced following precise analysis. A replacement is allowable if each possible flow of the program code fragment 42 ends with an exit or a subroutine return. In such cases, however, the corresponding library code fragment 30x is called by means of a normal jump instruction rather than by means of a subroutine call instruction. These considerations may also be included even at the time of generation of the library 28, so that the latter contains only such library code fragments 30x that may be used without further constraints.

The library 28 should be of such construction that it provides appropriate library code fragments 30x as often as possible and thus offers as may optimization possibilities as possible. Thus, for example, the library code fragment 30B of FIG. 1 is matched to the hardware characteristics of the data carrier 10. If the input bit requested in this library code fragment 30B corresponds to a frequently required signal value, it is to be assumed that corresponding program code fragments 42 occur time and again in the compiler-generated program code 38 even for greatly differing applications of the data carrier 10. Similarly, frequent operating system calls can be covered by corresponding library code fragments 30x. A further source for repeating code fragments in the compiler-generated program code 38 results from the fact that the code generation in the compiler 36 is performed according to certain schemas, and recurring code structures are generated as a consequence.

Overall, therefore, it is advantageous, for the purpose of generating the library 28, to statistically evaluate the program code 38 generated by the compiler 36 for a multiplicity of applications designated for the hardware and the operating system of the data carrier 10.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for optimising compiler-generated program code intended for a portable data carrier having a processor core and a first and second memory area, comprising:

the first memory area being provided to receive the optimised program code, the second memory area being provided to receive a predefined library having a multiplicity of library code fragments, wherein the contents of the predefined library have been determined independently from the compiler-generated program code that is to be optimized, and the compiler-generated program code being searched for program code fragments that perform the same function as a respective one of the library code fragments, the program code fragments found thereby being replaced by respectively one call of the corresponding library code fragment.

2. The method according to claim 1, wherein a program code fragment is replaced by a library code fragment only if both code fragments are identical in their form as executable machine code.

3. The method according to claim 1, wherein at least some library code fragments are parameterised.

4. The method according to claim 1, wherein a program code fragment to be replaced is replaced, at least if the program code fragment does not interfere with the program flow, by a subroutine call instruction to the corresponding library code fragment.

5. The method according to claim 1, wherein the compiler-generated program code exists in the form of assembler source code, and the optimization procedure is performed on a source code level.

6. The method according to claim 1, wherein the predefined library is matched to at least one of the following:
   the hardware of the portable data carrier,
   an operating system of the portable data carrier, and
   a compiler used in the generation of the compiler-generated program code.

7. The method according to claim 1, wherein the first memory area is electrically programmable.

8. The method according to claim 1, wherein the second memory area is mask-programmable.

9. The method according to claim 1, wherein the first memory area occupies more chip area per memory cell in the portable data carrier than is occupied by the second memory area.

10. A computer program product comprising a computer-readable storage medium and program instructions for a general-purpose computer stored in the computer-readable storage medium, the program instructions causing the general-purpose computer to optimize compiler-generated program code intended for a portable data carrier having both a processor and a first and second memory area, the first memory area being provided to receive the optimized program code, the second memory area being provided to receive a predefined library having a multiplicity of library code fragments, wherein the contents of the predefined library have been determined independently from the compiler-generated program code that is to be optimized, and the optimization includes searching the compiler-generated program code for program code fragments that perform the same function as a respective one of the library code fragments, the program code fragments found thereby being replaced by respectively one call of the corresponding library code fragment.

11. The computer program product according to claim 10, wherein the program instructions additionally implement a compiler for converting a high-level language source code into the compiler-generated program code.

12. The computer program product according to claim 10, wherein a program code fragment is replaced by a library code fragment only if both code fragments are identical in their form as executable machine code.

13. The computer program product according to claim 10, wherein a program code fragment to be replaced is replaced, at least if the program code fragment does not interfere with the program flow, by a subroutine call instruction to the corresponding library code fragment.

14. The computer program product according to claim 10, wherein the compiler-generated program code exists in the form of assembler source code, and the optimization procedure is performed on a source code level.

15. The computer program product according to claim 10, wherein the predefined library is matched to at least one of the following:
   the hardware of the portable data carrier,
   an operating system of the portable data carrier, and
   a compiler used in the generation of the compiler-generated program code.

16. The computer program product according to claim 10, wherein the first memory area is electrically programmable, and the second memory area is mask-programmable, and the first memory area occupies more chip area per memory cell in the portable data carrier than is occupied by the second memory area.

17. A portable data carrier having a processor, a first memory area and a second memory area, there being contained in the first memory area optimized program code, and there being contained in the second memory area a library which is predefined independently of the optimized program code and has a multiplicity of library code fragments, wherein the contents of the predefined library have been determined independently from the compiler-generated program code that is to be optimized, and wherein the optimized program code has been obtained from compiler-generated program code by searching for program code fragments that perform the same function as a respective one of the library code fragments, the program code fragments found thereby being replaced by respectively one call of the corresponding library code fragment.

18. The portable data carrier according to claim 17, wherein, when obtaining the optimized program code from the compiler-generated program code, a program code fragment is replaced by a library code fragment only if both code fragments are identical in their form as executable machine code.

19. The portable data carrier according to claim 17, wherein the predefined library is matched to at least one of the following:
   the hardware of the portable data carrier,
   an operating system of the portable data carrier, and
   a compiler used in the generation of the compiler-generated program code.

20. The portable data carrier according to claim 17, wherein the first memory area is electrically programmable, and the second memory area is mask-programmable, and the first memory area occupies more chip area per memory cell in the portable data carrier than is occupied by the second memory area.

21. The computer program product according to claim 10, wherein the first memory area occupies more chip area per memory cell in the portable data carrier than is occupied by the second memory area.

22. The portable data carrier according to claim 17, wherein the first memory area occupies more chip area per memory cell in the portable data carrier than is occupied by the second memory area.

* * * * *